Aug. 9, 1927.

W. C. NASH 1,638,505

ANTIFROST VISION GLASS

Filed July 13, 1925

Inventor
William C. Nash

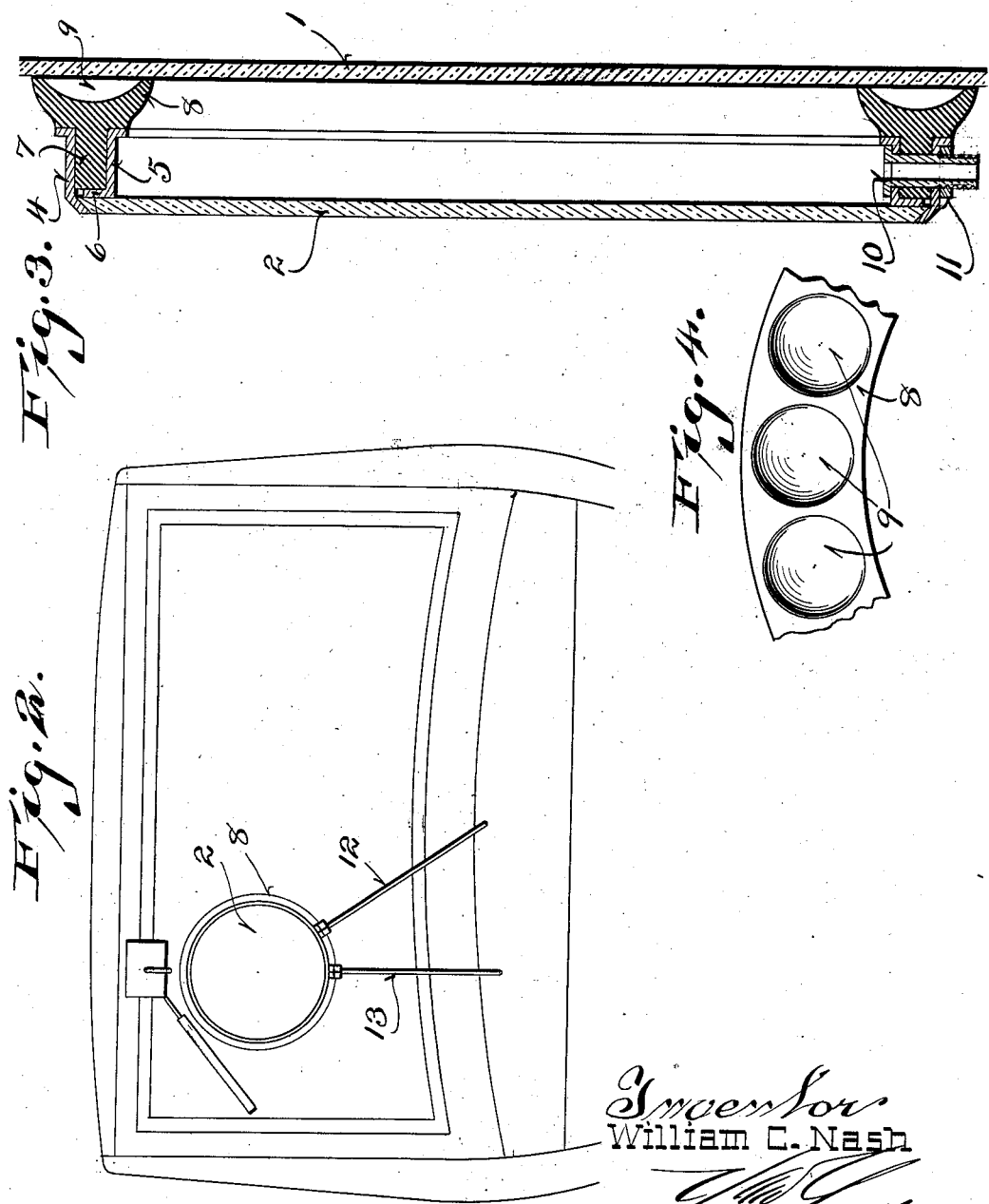

Patented Aug. 9, 1927.

1,638,505

UNITED STATES PATENT OFFICE.

WILLIAM C. NASH, OF NEENAH, WISCONSIN.

ANTIFROST VISION GLASS.

Application filed July 13, 1925. Serial No. 43,240.

This invention relates to an anti-frost vision glass for attachment to a vehicle windshield.

Objects of this invention are to provide a device for preventing the formation of frost or condensation on the windshield of a vehicle even when the vehicle is used in cold weather.

Further objects are to provide an attachment, which may be very quickly applied to the windshield in a simple and easy manner, and which is furnished with heat in any suitable manner, preferably from the internal combustion engine.

In the drawings:—

Figure 2 is a view of the windshield of the automobile showing the device attached thereto.

Figure 3 is an enlarged sectional view through the device and a portion of the windshield.

Figure 4 is a detail of the suction cups.

Figure 1:
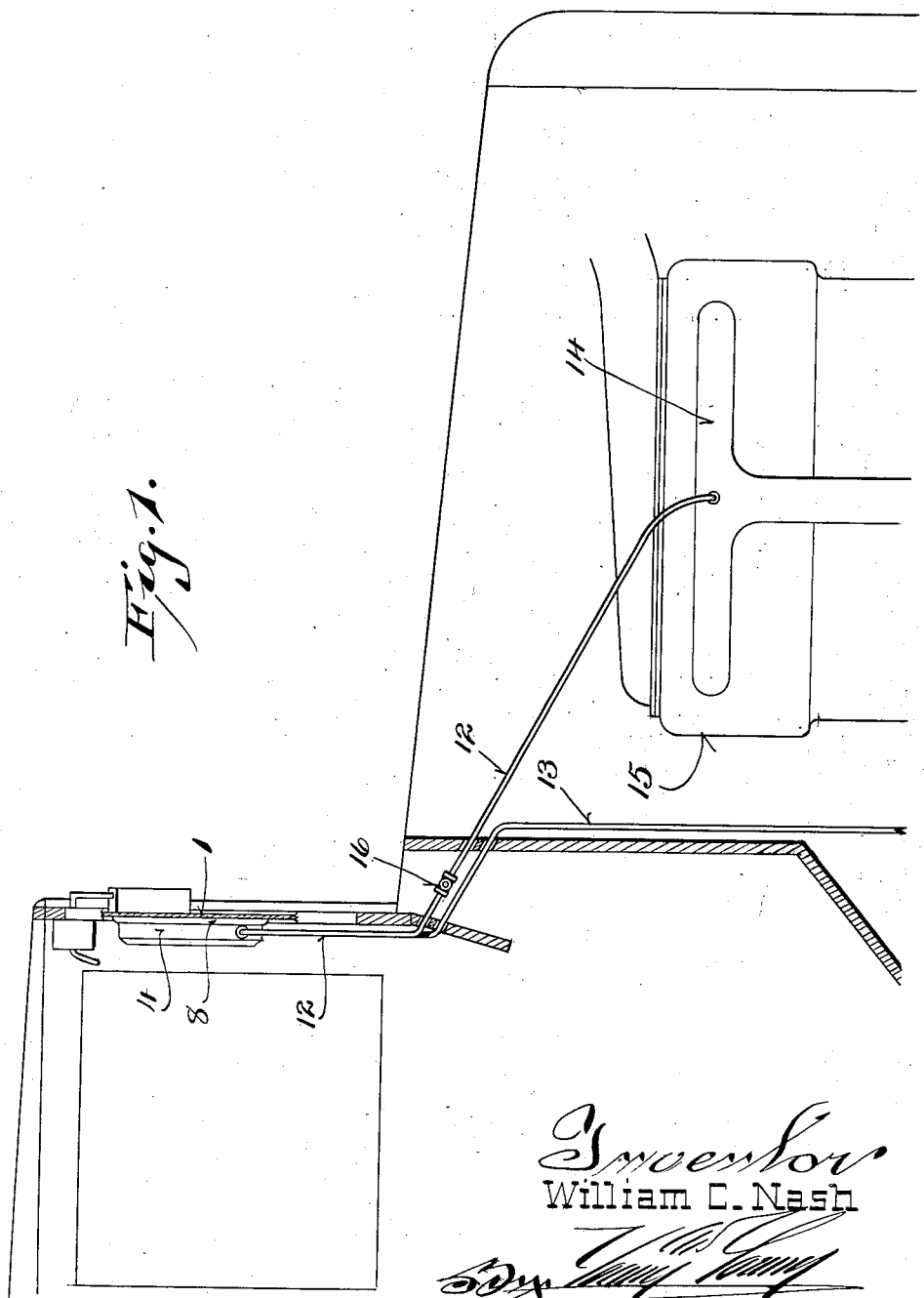
Figure 1 is a sectional view through a portion of the automobile showing the attachment in position.

Referring to the drawings it will be seen that the vehicle windshield is indicated at 1. The device is adapted for attachment preferably to the inner side of the windshield, and consists preferably of a circular piece of glass 2 which is held by the outer ring 4. An inner ring 5 is spaced a slight distance from the ring 4 and is provided with a flange 6 against which the glass 2 rests, such glass being held rigidly in place by the two rings, as shown most clearly in Figure 3.

A rubber member consisting of a shank 7 positioned between the rings 4 and 5, is provided with an enlarged face 8 adapted to contact with the inner side of the windshield 1. This enlarged portion is provided with a plurality of cup-shaped recesses 9 which form in effect vacuum cups and serve to hold the device rigidly attached to the windshield.

Inlet and outlet fittings or nipples 10 extend through the rings 4 and 5 and are held in clamped relation by means of nuts 11. These fittings connect with pipes 12 and 13, as shown in Figure 1, the pipe 12 extending to the exhaust manifold 14 of the engine, while the pipe 13 extends downwardly and discharges at any suitable point either direct into the air or into the exhaust pipe at a point remote from the manifold. Preferably a cutoff valve 16 is provided in the pipe 12.

In operation the device is attached to the windshield by means of the suction or vacuum cups, and the valve 16 is open a sufficient amount to permit warm gases to pass into the chamber between the glasses 1 and 2. This warms the glass or windshield 1 and prevents the formation of either frost or condensation upon such windshield.

Further, it is to be noted particularly that the driver's vision is not obscured in any manner by this device as he may freely look through the device at all times.

Further it is to be noted that no frost can obscure his vision with this device and that he is at all times assured of a clear vision through the windshield even in the wintertime.

It is to be understood that other means may be employed for attaching the device to the windshield instead of vacuum cups, although the vacuum cups are preferable as they permit ready attaching and detaching of the device.

Although the invention has been described in considerable detail, it is to be understood that the same may be variously embodied and is therefore to be limited only as claimed.

I claim:—

1. A removable attachment for a windshield comprising a glass disc, a ring carrying said disc, a rubber annular member carried by said ring and projecting therefrom, said member having suction means at its outer end adapted to engage the windshield and space said disk from said windshield, and pipes leading into and out of said device through said ring and adapted to conduct a heating fluid to and from the space between said disk and said windshield.

2. A removable attachment for a windshield comprising a transparent plate having a peripheral ring secured thereto, said ring being composed of an inner and an outer member forming a channel therebetween, a rubber ring having a projecting portion positioned within said channel and having an outwardly projecting continuous portion adapted to contact with said windshield, said outwardly projecting portion having suction means for attachment to the windshield, and nipples leading through said ring, and the outwardly projecting portion of the rubber member for conducting heated fluid into and out of the space between said transparent plate and said windshield.

3. An attachment for a windshield comprising a disc of glass having a peripheral marginal portion, a metal ring having an inturned portion engaging the peripheral portion, a second metal ring concentric with said first mentioned metal ring and spaced therefrom, a rubber ring secured between said metal rings, nipples leading through said metal rings and said rubber ring and leading into and out of the space adjacent said glass disc, said rubber ring having an enlarged annular portion projecting from the metal rings, said enlarged portion having a plurality of vacuum cups formed therein adapted to engage a windshield.

In testimony that I claim the foregoing I have hereunto set my hand at Neenah, in the county of Winnebago and State of Wisconsin.

WILLIAM C. NASH.